US012812194B2

(12) United States Patent
Nonaka et al.

(10) Patent No.: US 12,812,194 B2
(45) Date of Patent: Nov. 24, 2026

(54) SERVER, METHOD, AND NON-TRANSITORY STORAGE MEDIUM

(71) Applicant: TOYOTA JIDOSHA KABUSHIKI KAISHA, Toyota (JP)

(72) Inventors: Ryogo Nonaka, Kawasaki (JP); Ai Miyata, Hirakata (JP); Keisuke Okamoto, Chofu (JP); Yuka Takiguchi, Fukaya (JP); Nahoko Shibano, Tokyo (JP); Yuta Shishime, Tokyo (JP); Tsuyoshi Okada, Nagoya (JP); Shota Komatsu, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 18/760,067

(22) Filed: Jul. 1, 2024

(65) Prior Publication Data

US 2025/0056076 A1 Feb. 13, 2025

(30) Foreign Application Priority Data

Aug. 10, 2023 (JP) ................................ 2023-131627

(51) Int. Cl.

*H04N 21/262* (2011.01)
*H04N 21/2187* (2011.01)
*H04N 21/414* (2011.01)
*H04N 21/8549* (2011.01)

(52) U.S. Cl.

CPC ....... *H04N 21/262* (2013.01); *H04N 21/2187* (2013.01); *H04N 21/41422* (2013.01); *H04N 21/8549* (2013.01)

(58) Field of Classification Search

CPC ............ H04N 21/262; H04N 21/2187; H04N 21/41422; H04N 21/8549; H04N 21/41407; H04N 21/2343; H04N 21/4334; H04N 21/47217; G06Q 50/10
USPC .......................................................... 725/116
See application file for complete search history.

(56) References Cited

U.S. PATENT DOCUMENTS

| | | | | |
|---|---|---|---|---|
| 7,904,814 | B2 * | 3/2011 | Errico .................. | G11B 27/005 715/725 |
| 8,848,790 | B2 * | 9/2014 | Fujihara ................ | H04N 19/61 375/240.07 |
| 11,240,173 | B2 * | 2/2022 | Larabi .................. | H04L 67/562 |

(Continued)

FOREIGN PATENT DOCUMENTS

JP 2022-080651 A 5/2022

*Primary Examiner* — Sahar Aqil Riaz
(74) *Attorney, Agent, or Firm* — Oliff PLC

(57) ABSTRACT

A server includes a communication unit and a control unit. The control unit obtains, as a target time, a time when a predetermined trigger is detected for a visitor moving to an event venue. When the target time is later than a start time of an event held at the event venue, by controlling the communication unit such that the communication unit transmits a first shortened moving image obtained by shortening a first moving image of the event shot from the start time to the target time, the control unit presents the first shortened moving image to the moving visitor. After a playback of the first shortened moving image ends, by controlling the communication unit such that the communication unit transmits a live moving image of the event, the control unit presents the live moving image to the moving visitor.

15 Claims, 5 Drawing Sheets

(56) References Cited

U.S. PATENT DOCUMENTS

| | | | | |
|---|---|---|---|---|
| 11,691,727 | B1 * | 7/2023 | Brown | G05D 1/101 701/2 |
| 11,775,052 | B1 * | 10/2023 | Douglas | G06F 3/0304 600/431 |
| 12,133,028 | B1 * | 10/2024 | Pachikov | H04N 7/183 |
| 12,593,091 | B1 * | 3/2026 | Kaminsky | H04N 21/41422 |
| 2004/0119589 | A1 * | 6/2004 | French | G06Q 30/0267 340/539.11 |
| 2012/0162436 | A1 * | 6/2012 | Cordell | H04N 21/23109 348/158 |
| 2014/0327779 | A1 * | 11/2014 | Eronen | H04N 21/21805 348/159 |
| 2015/0105960 | A1 * | 4/2015 | Pilutti | B60W 50/14 701/23 |
| 2018/0025078 | A1 * | 1/2018 | Quennesson | G06F 16/70 725/141 |
| 2018/0184139 | A1 * | 6/2018 | Lin | H04N 21/234 |
| 2019/0383622 | A1 * | 12/2019 | Aich | G06Q 10/02 |
| 2020/0349192 | A1 * | 11/2020 | Sarkar | G06F 16/7867 |
| 2022/0368730 | A1 * | 11/2022 | Miao | H04W 76/10 |
| 2023/0275944 | A1 * | 8/2023 | Slater | H04L 12/40182 709/231 |
| 2026/0095611 | A1 * | 4/2026 | Kaminsky | H04N 21/41422 |
| 2026/0095612 | A1 * | 4/2026 | Kaminsky | H04L 65/752 |

* cited by examiner

SERVER, METHOD, AND NON-TRANSITORY STORAGE MEDIUM

CROSS-REFERENCE TO RELATED APPLICATION

This application claims priority to Japanese Patent Application No. 2023-131627 filed on Aug. 10, 2023 incorporated herein by reference in its entirety.

BACKGROUND

1. Technical Field

The present disclosure relates to a server, method, and non-transitory storage medium.

2. Description of Related Art

Conventionally, technologies are known for providing services to visitors to an event venue where an event such as an exhibition or a competitive sports match is held. For example, Japanese Unexamined Patent Application Publication No. 2022-080651 (JP 2022-080651 A) discloses an information processing device that creates, when first event information included in a schedule of a first user and second event information included in a schedule of a second user satisfy a predetermined condition, a group including the first user and the second user, and that proposes use of shared transportation means.

SUMMARY

However, there is room for improvement in the technology for providing services to visitors to event venues. For example, when a visitor cannot arrive at an event venue by the start time of an event, the visitor may not be able to experience part of the event, which may reduce the visitor's satisfaction with the event.

In view of such circumstances, the present disclosure provides a technology for providing services to visitors to an event venue.

A server according to an aspect of the present disclosure is a server including:

a communication unit and a control unit.

The control unit is configured to obtain, as a target time, a time when a predetermined trigger is detected for a visitor moving to an event venue.

The control unit is configure to, when the target time is later than a start time of an event held at the event venue, by controlling the communication unit such that the communication unit transmits a first shortened moving image obtained by shortening a first moving image of the event shot from the start time to the target time, present the first shortened moving image to the moving visitor.

The control unit is configured to, after a playback of the first shortened moving image ends, by controlling the communication unit such that the communication unit transmits a live moving image of the event, present the live moving image to the moving visitor.

A method according to an aspect of the present disclosure is a method that is executed by a server.

The method includes:

- obtaining, as a target time, a time when a predetermined trigger is detected for a visitor moving to an event venue;
- when the target time is later than a start time of an event held at the event venue, by transmitting a first shortened moving image obtained by shortening a first moving image of the event shot from the start time to the target time, presenting the first shortened moving image to the moving visitor; and
- after a playback of the first shortened moving image ends, by transmitting a live moving image of the event, presenting the live moving image to the moving visitor.

A non-transitory storage medium according to an aspect of the present disclosure is a non-transitory storage medium storing instructions. The instructions are instructions that are executable by one or more servers, and that cause the one or more servers to perform the following functions:

- obtaining, as a target time, a time when a predetermined trigger is detected for a visitor moving to an event venue;
- when the target time is later than a start time of an event held at the event venue, by transmitting a first shortened moving image obtained by shortening a first moving image of the event shot from the start time to the target time, presenting the first shortened moving image to the moving visitor; and
- after a playback of the first shortened moving image ends, by transmitting a live moving image of the event, presenting the live moving image to the moving visitor.

According to the above aspects of the present disclosure, a technology for providing services to visitors to an event venue is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
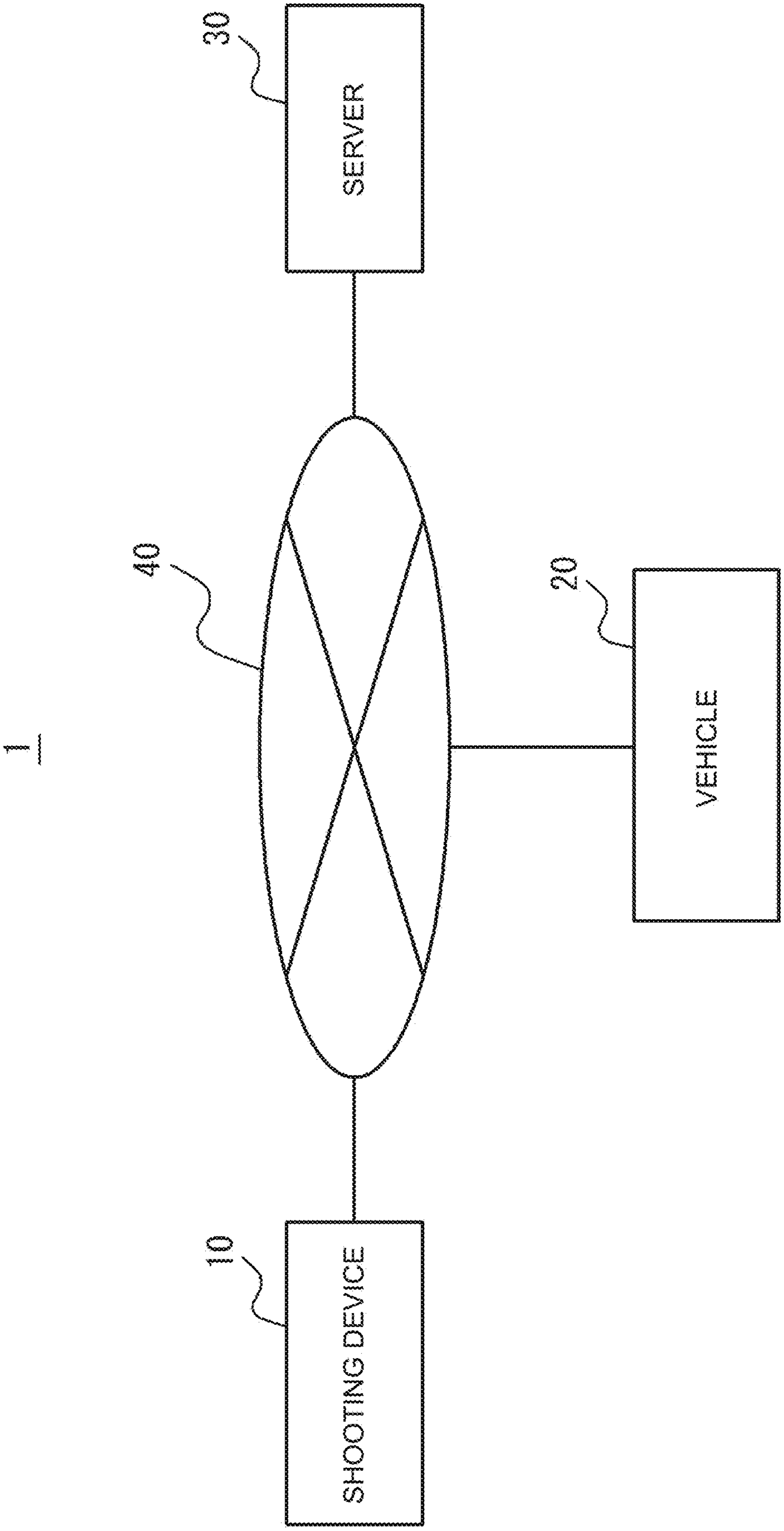
FIG. 1 is a block diagram showing a schematic configuration of a system according to an embodiment of the present disclosure.

The outline of a system 1 according to an embodiment of the present disclosure will be described with reference to FIG. 1. The system 1 includes one or more shooting devices 10, a vehicle 20, and a server 30. The server 30 can communicate with each of the shooting device 10 and the vehicle 20 via a network 40 such as the Internet.

The shooting device 10 is a network camera that can transmit a moving image via the network 40. In this embodiment, the shooting device 10 is installed at an event venue so that the shooting device 10 can shoot the event being held at the event venue. The "event venue" is, for example, a stadium, but is not limited to this, and may be any venue. The "event" is, for example, a competitive sports match, but is not limited to this, and may be any event. When the system 1 includes a plurality of the shooting devices 10, the shooting devices 10 are disposed at mutually different positions within the event venue. In other words, the shooting devices 10 are disposed at the event venue so that they can shoot the event from mutually different shooting positions.

The vehicle 20 is, for example, a gasoline vehicle, a battery electric vehicle (BEV), a hybrid electric vehicle (HEV), a plug-in hybrid electric vehicle (PHEV), or a fuel cell electric vehicle (FCEV). The vehicle 20 is not limited to these, and may be any vehicle in which a person can ride. The vehicle 20 may be able to be driven by a driver in the vehicle 20, or may be able to be driven remotely. The vehicle 20 may be capable of autonomous driving at levels such as levels 1 to 5 defined in the Society of Automotive Engineers (SAE) for example.

In this embodiment, the vehicle 20 is used to transport, to the event venue, users (hereinafter also referred to as "visitors") who come to the event venue to watch a sports match, for example. Specifically, the vehicle 20 transports visitors from a predetermined departure point to a destination, which is the event venue. The vehicle 20 may be operated in a manner, for example, similar to a shuttle bus, in which the vehicle 20 moves from a predetermined departure point to the event venue according to a predetermined schedule. Alternatively, the vehicle 20 may be operated in a manner, for example, similar to a taxi, in which the vehicle 20 travels from a departure point reserved by the visitor to the event venue. In this embodiment, for simplicity of explanation, the vehicle 20 will be described as a vehicle that transports one visitor at a time, but the number of visitors that the vehicle 20 can transport at one time may be two or more people.

The server 30 includes one computer or multiple computers that can communicate with each other. In this embodiment, the server 30 can receive a moving image of the event shot by the shooting device 10. Furthermore, the server 30 can transmit the received moving image to the vehicle 20 as a live moving image. Furthermore, the server 30 can transmit a shortened moving image obtained by shortening the received moving image to the vehicle 20. The moving image transmitted from the server 30 to the vehicle 20 is played back on a display installed in the vehicle cabin of the vehicle 20. In this way, by transmitting the moving image to the vehicle 20, the server 30 can present the moving image to the visitors aboard the vehicle 20.

First, the outline of the present embodiment will be described, and the details will be described later. The server 30 according to this embodiment obtains, as a target time, the time when a predetermined trigger is detected for the visitor who is moving to the event venue. When the target time is later than a start time of the event held at the event venue, the server 30 transmits a first shortened moving image obtained by shortening a first moving image of the event shot from the start time to the target time, thereby presenting the first shortened moving image to the moving visitor. After the playback of the first shortened moving image ends, the server 30 transmits the live moving image of the event, thereby presenting the live moving image to the moving visitor.

As described above, according to the present embodiment, the first shortened moving image obtained by shortening the first moving image of the event, which is shot from the start time of the event to the target time, is first presented to the visitor who is moving to the event venue, and then the live moving image of the event is presented. Therefore, for example, even when the visitor cannot arrive at the event venue by the start time of the event, the visitor watches the first shortened moving image while moving to the event venue, thereby indirectly experiencing the event after the start time. In addition, by watching the live moving image presented after a playback of the first shortened moving image while moving to the event venue, the visitor can indirectly experience the event after the playback of the first shortened moving image. Therefore, according to the present embodiment, the technology for providing services to visitors to an event venue can be improved in that it is possible to maintain or improve the satisfaction level of the visitors with the event regarding the visitors who cannot arrive at the event venue by the start time of the event.

Next, each configuration of the system 1 will be described in detail.

Configuration of Shooting Device

Figure 2:
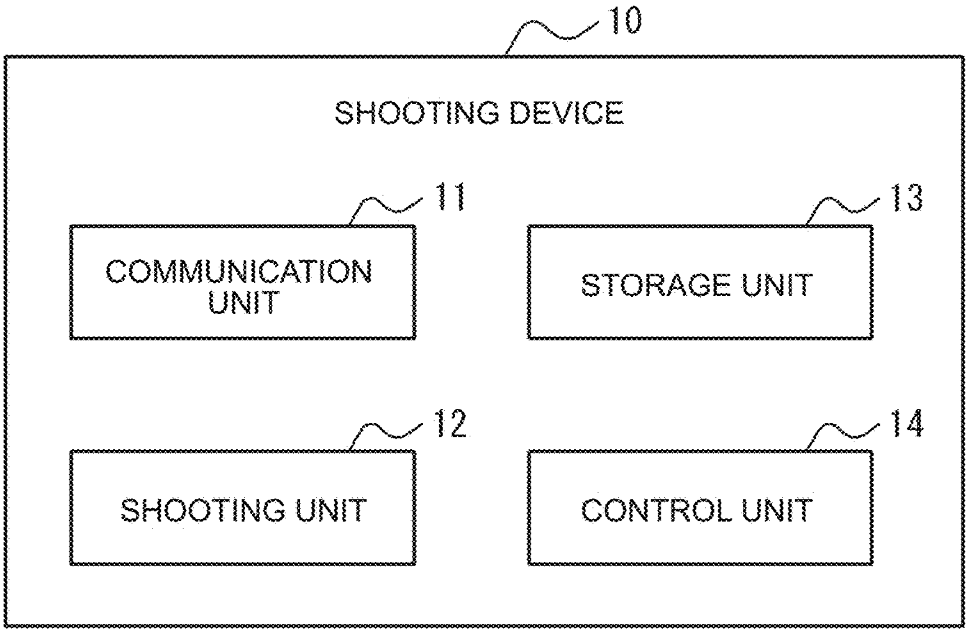
FIG. 2 is a block diagram showing a schematic configuration of a shooting device.

Components included in the shooting device 10 will be described with reference to FIG. 2. The shooting device 10 includes a communication unit 11, a shooting unit 12, a storage unit 13, and a control unit 14.

The communication unit 11 includes one or more communication interfaces connected to the network 40. The communication interfaces conform to, for example, a mobile communication standard such as 4th generation (4G) and 5th generation (5G), a wired local area network (LAN) standard, or a wireless LAN standard. However the standards are not limited to these, and the communication interfaces may conform to any communication standard.

The shooting unit 12 includes one or more cameras. The shooting unit 12 can generate a moving image by shooting the event held at the event venue.

The storage unit 13 includes one or more memories. The memories are, for example, a semiconductor memory, a magnetic memory, or an optical memory, but are not limited to these memories. Each memory included in the storage unit 13 may function as, for example, a main storage device, an auxiliary storage device, or a cache memory. The storage unit 13 stores any information used for the operation of the shooting device 10. For example, the storage unit 13 may store, a system program, an application program, or the like. Furthermore, the storage unit 13 may temporarily store the moving image generated by the shooting unit 12, for example.

The control unit 14 includes one or more processors, one or more programmable circuits, one or more dedicated circuits, or a combination thereof. The processors are, for example, a general-purpose processor such as a central processing unit (CPU) or a graphics processing unit (GPU), or a dedicated processor specialized for a specific process, but are not limited to these processors. The programmable circuits are, for example, a field-programmable gate array (FPGA), but are not limited to the circuit. The dedicated circuits are, for example, an application specific integrated circuit (ASIC), but are not limited to the circuit. The control unit 14 controls the operation of the entire shooting device 10.

Configuration of Vehicle

Figure 3:
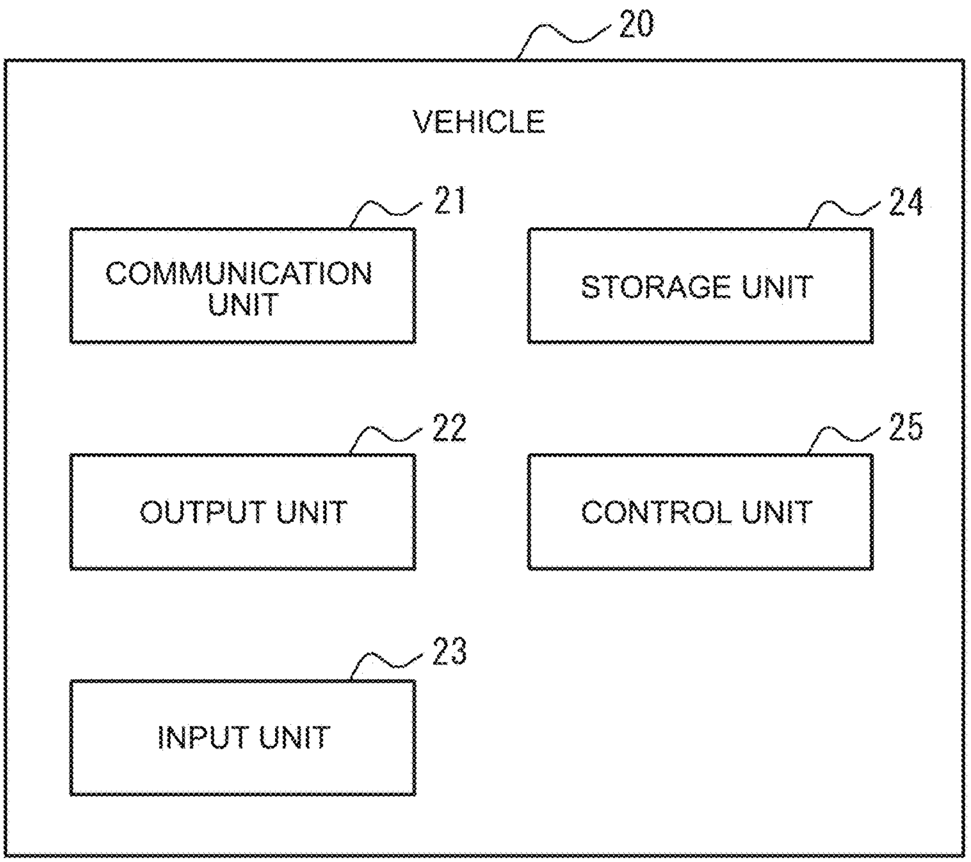
FIG. 3 is a block diagram showing a schematic configuration of a vehicle.

Each component included in the vehicle 20 will be described with reference to FIG. 3. The vehicle 20 includes a communication unit 21, an output unit 22, an input unit 23, a storage unit 24, and a control unit 25.

The communication unit 21 includes one or more communication interfaces connected to the network 40. The communication interfaces conform to, for example, a mobile communication standard. However, the standard is not limited to this, and the communication interfaces may conform to any communication standard.

The output unit 22 includes one or more output devices that output information. For example, the output devices are, but are not limited to, a display that outputs information as images, a speaker that outputs information as audio, and the like. Alternatively, the output unit 22 may include an interface for connecting an external output device.

The input unit 23 includes one or more input devices that detect input operations by the user. The input devices are, for example, a physical key, a capacitance key, a mouse, a touch panel, a touch screen provided integrally with the display of the output unit 22, a microphone, and the like, but are not limited to these. Alternatively, the input unit 23 may include an interface for connecting an external input device.

The storage unit 24 includes one or more memories. Each memory included in the storage unit 24 may function as, for example, a main storage device, an auxiliary storage device, or a cache memory. The storage unit 24 stores any information used for the operation of the vehicle 20. For example, the storage unit 24 may store system programs, application programs, embedded software, map information, and the like.

The control unit 25 includes one or more processors, one or more programmable circuits, one or more dedicated circuits, or a combination of these. The control unit 25 controls the operation of the entire vehicle 20.

Server Configuration

Figure 4:
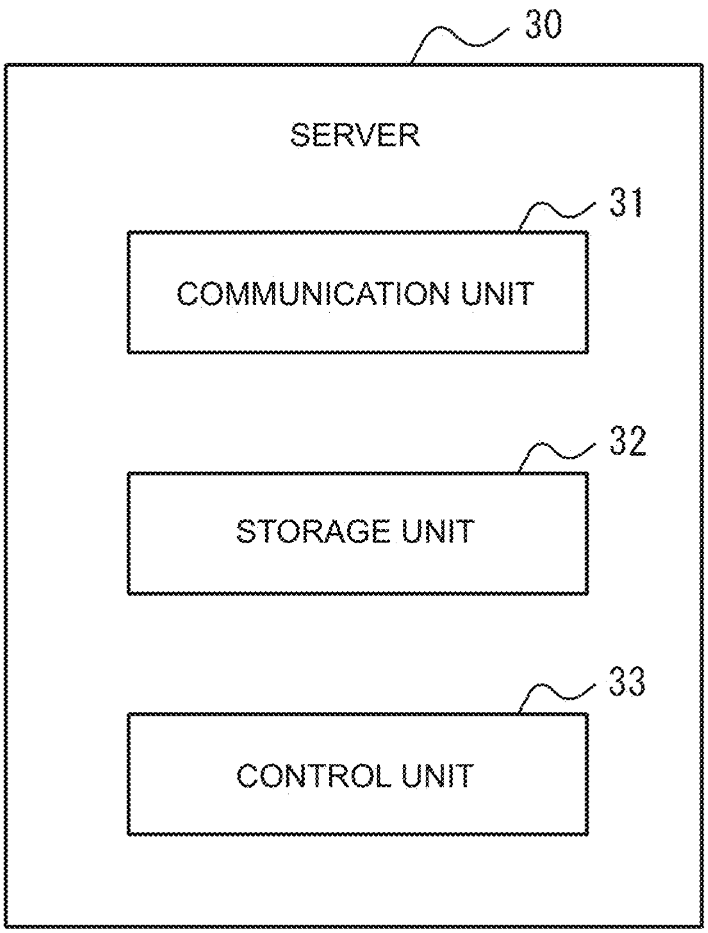
FIG. 4 is a block diagram showing a schematic configuration of a server.

Each component included in the server 30 will be described with reference to FIG. 4. The server 30 includes a communication unit 31, a storage unit 32, and a control unit 33.

The communication unit 31 includes one or more communication interfaces connected to the network 40. The communication interfaces conform to, for example, a wired LAN standard or a wireless LAN standard. However, the standards are not limited to these, and the communication interfaces may conform to any communication standard.

The storage unit 32 includes one or more memories. Each memory included in the storage unit 32 may function as, for example, a main storage device, an auxiliary storage device, or a cache memory. The storage unit 32 stores any information used for the operation of the server 30. For example, the storage unit 32 may store system programs, application programs, embedded software, databases, and the like. Furthermore, the storage unit 32 may store a moving image received from the shooting device 10 via the network 40.

The control unit 33 includes one or more processors, one or more programmable circuits, one or more dedicated circuits, or a combination of these. The control unit 33 controls the operation of the entire server 30.

Server Operation

Figure 5:
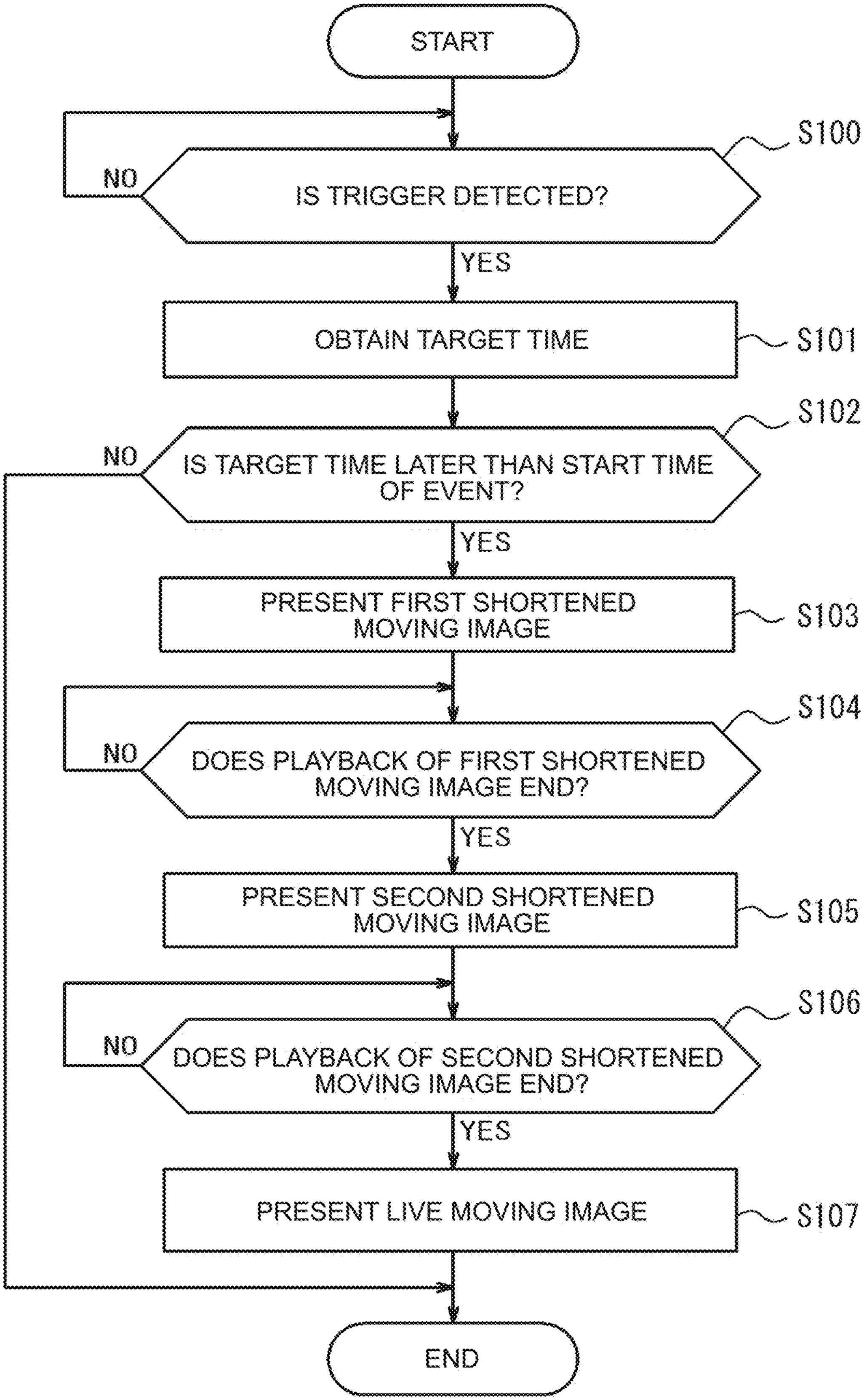
FIG. 5 is a flowchart showing an operation of the server.

The operation of the server 30 will be described with reference to FIG. 5.

S100: The control unit 33 of the server 30 determines whether a predetermined trigger is detected for the visitor who is moving to the event venue. When it is determined that the trigger is detected (S100—Yes), the process proceeds to S101. On the other hand, when it is determined that no trigger is detected (S100—No), the process repeats S100.

In present embodiment, the "trigger" is that the visitor boards on the vehicle 20 with the event venue as the destination. As described above, the vehicle 20 is used to transport, to the event venue, the visitor to the event venue. Therefore, the user who boards on the vehicle 20 can be regarded as the "visitor who is moving to the event venue." When the user boards on the vehicle 20, the control unit 25 of the vehicle 20 notifies the server 30 via the communication unit 21 of the time when the visitor moving to the event venue boards on the vehicle 20. When the control unit 33 of the server 30 receives the notification indicating the boarding time from the vehicle 20, the control unit 33 determines that the trigger is detected at the boarding time.

S101: When it is determined in S100 that the trigger is detected (S100—Yes), the control unit 33 obtains the time when the trigger is detected as the target time.

In this embodiment, the control unit 33 obtains the boarding time received from the vehicle 20 in S100 as the target time.

S102: The control unit 33 determines whether the target time is later than the start time of the event held at the event venue. When it is determined that the target time is later than the start time (S102—Yes), the process proceeds to S103. On the other hand, when it is not determined that the target time is later than the start time (S102—No), the process ends.

Specifically, the control unit 33 compares, for example, the target time with the start time of the event stored in the storage unit 32 in advance, and determines whether the target time is later than the start time.

S103: When it is determined in S102 that the target time is later than the start time (S102—Yes), the control unit 33 presents the first shortened moving image to the visitor who is moving to the event venue.

The "first shortened moving image" is a shortened version of the first moving image of the event shot from the start time to the target time. Specifically, the control unit 33 receives the moving image of the event shot by the shooting device 10 after the start time from the shooting device 10 via the communication unit 31. The control unit 33 obtains a portion of the received moving image that is shot from the start time to the target time as the first moving image. The control unit 33 shortens the first moving image by performing any moving image editing processing to generate the first shortened moving image. Here, any method can be used to shorten the moving image. For example, n times speed playback, unnecessary scene deletion, or the like may be adopted. Note that when a method of unnecessary scene deletion is adopted, the control unit 33 may automatically determine and delete unnecessary scenes using, for example, artificial intelligence (AI) or a rule-based algorithm. The control unit 33 then presents the first shortened moving image to the visitor aboard the vehicle 20 by transmitting the first shortened moving image to the vehicle 20. Specifically, the control unit 25 of the vehicle 20 plays back the first shortened moving image received from the server 30 and displays it on the display of the output unit 22.

S104: The control unit 33 determines whether the playback of the first shortened moving image presented to the visitor ends. When it is determined that the playback of the first shortened moving image ends (S104—Yes), the process proceeds to S105. On the other hand, when it is determined that the playback of the first shortened moving image does not end (S104—No), the process repeats S104.

Specifically, when the playback of the first shortened moving image ends, the control unit 25 of the vehicle 20 notifies the server 30 via the communication unit 21 of the time when the playback of the first shortened moving image ends (first playback end time). When the control unit 33 of the server 30 receives the notification indicating the first playback end time from the vehicle 20, the control unit 33 determines that the playback of the first shortened moving image ends.

S105: When it is determined in S104 that the playback of the first shortened moving image ends (S104—Yes), the control unit 33 presents a second shortened moving image to the visitor who is moving to the event venue.

The "second shortened moving image" is a shortened version of a second moving image of the event that is shot from the target time to the playback end time of the first shortened moving image. Specifically, the control unit 33 receives the moving image of the event shot by the shooting device 10 after the target time from the shooting device 10 via the communication unit 31. The control unit 33 obtains a portion of the received moving image that is shot from the target time to the first playback end time as the second moving image. The control unit 33 shortens the second moving image by performing any moving image editing processing to generate the second shortened moving image. The control unit 33 then presents the second shortened moving image to the visitor aboard the vehicle 20 by transmitting the second shortened moving image to the vehicle 20. Specifically, the control unit 25 of the vehicle 20 plays back the second shortened moving image received from the server 30 and displays it on the display of the output unit 22.

S106: The control unit 33 determines whether the playback of the second shortened moving image presented to the visitor ends. When it is determined that the playback of the second shortened moving image ends (S106—Yes), the process proceeds to S107. On the other hand, when it is determined that the playback of the second shortened moving image does not end (S106—No), the process repeats S106.

Specifically, when the playback of the second shortened moving image ends, the control unit 25 of the vehicle 20 notifies the server 30 via the communication unit 21 of the time when the playback of the second shortened moving image ends (second playback end time). When the control unit 33 of the server 30 receives the notification indicating the second playback end time from the vehicle 20, the control unit 33 determines that the playback of the second shortened moving image ends.

S107: When it is determined in S106 that the playback of the second shortened moving image ends (S106—Yes), the control unit 33 presents the live moving image to the visitor who is moving to the event venue. After that, the process ends.

Specifically, the control unit 33 transmits the live moving image received from the shooting device 10 to the vehicle 20 via the communication unit 31, thereby presenting the live moving image to the visitor aboard the vehicle 20. The live moving image may be presented, for example, until the time (arrival time) when the vehicle 20 arrives at the event venue, which is the destination.

Figure 6:
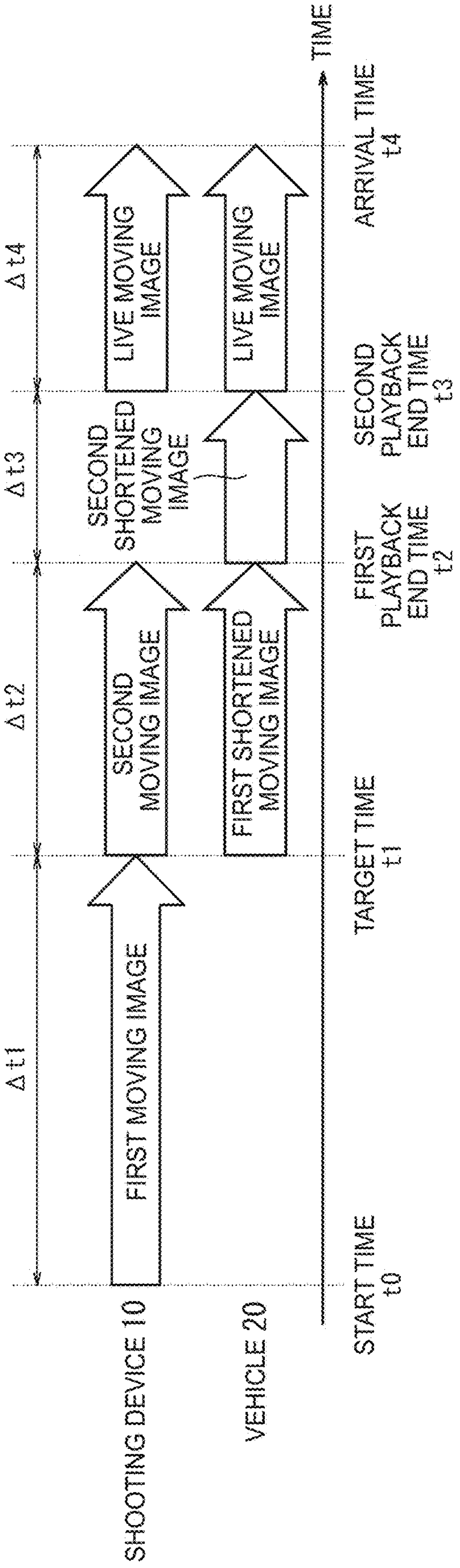
FIG. 6 is a graph showing an example of a time of moving image shooting by a shooting device and a time of a moving image playback by a vehicle.

Here, with reference to FIG. 6, various moving images related to the above S103 to S107 will be specifically explained. In the graph of FIG. 6, the horizontal axis shows time, the upper part of the vertical axis shows shooting time of the moving image by the shooting device 10, and the lower part of the vertical axis shows playback time of the moving image by the vehicle 20.

In the example shown in FIG. 6, a target time t1 is later than a start time t0 by Δt1. Therefore, the first moving image is a moving image that has a length Δt1 and is shot by the shooting device 10 from the start time t0 to the target time t1. As described above, the first shortened moving image is generated by shortening the first moving image. In the example shown in FIG. 6, a length of the first shortened moving image is Δt2 (where Δt2<Δt1). In the vehicle 20, the playback of the first shortened moving image starts at the target time t1 and ends at a first playback end time t2.

In the example shown in FIG. 6, the second moving image is a moving image that has the length Δt2 and is shot by the shooting device 10 from the target time t1 to the first playback end time t2. As described above, the second shortened moving image is generated by shortening the second moving image. In the example shown in FIG. 6, a length of the second shortened moving image is Δt3 (where Δt3<Δt2). In the vehicle 20, the playback of the second shortened moving image starts at the first playback end time t2 and ends at a second playback end time t3. Then, from the second playback end time t3 to an arrival time t4, the live moving image shot by the shooting device 10 is played back in the vehicle 20.

Here, a first ratio of the length of the first shortened moving image to the length of the first moving image (i.e., Δt2/Δt1) and a second ratio of the length of the second shortened moving image to the length of the second moving image (i.e., Δt3/Δt2) may be different. For example, the control unit 33 of the server 30 may generate the first shortened moving image and the second shortened moving image so that the second ratio is larger than the first ratio. Generally, the larger a ratio of the length of a shortened moving image to the length of an original moving image (that is, the closer the ratio is to 1), the more a live feeling of the shortened moving image enhances. According to the configuration, since the live feeling increases in the order of the first shortened moving image, the second shortened moving image, and the live moving image, the satisfaction level of the visitors with the event can be further improved.

As described above, the server 30 according to the present embodiment obtains, as the target time, the time when the predetermined trigger is detected for the visitor who is moving to the event venue. When the target time is later than the start time of the event held at the event venue, the server 30 transmits the first shortened moving image obtained by shortening the first moving image of the event shot from the start time to the target time, thereby presenting the first shortened moving image to the moving visitor. After the playback of the first shortened moving image ends, the server 30 transmits the live moving image of the event, thereby presenting the live moving image to the moving visitor.

According to the configuration, as described above, for example, even when the visitor cannot arrive at the event venue by the start time of the event, the visitor watches the first shortened moving image while moving to the event venue, thereby indirectly experiencing the event after the start time. In addition, by watching the live moving image presented after the playback of the first shortened moving image while moving to the event venue, the visitor can indirectly experience the event after the playback of the first shortened moving image. Therefore, according to the present embodiment, the technology for providing services to visitors to an event venue can be improved in that it is possible to maintain or improve the satisfaction level of the visitors with the event regarding the visitors who cannot arrive at the event venue by the start time of the event.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, in the embodiment described above, the configuration and the operation of the server 30 may be distributed to a plurality of computers capable of communicating with each other. Furthermore, part of the operation of the server 30 shown in FIG. 5 may be omitted. For example, an embodiment is also possible in which the live moving image is presented after the playback of the first shortened moving image ends by omitting S105 and S106 described above.

Furthermore, an embodiment is also possible in which, for example, a general-purpose computer functions as the server 30 according to the above embodiment. Specifically, a program describing processing contents for realizing each function of the server 30 according to the above embodiment is stored in the memory of the general-purpose computer, and the program is read and executed by the processor. Therefore, the present disclosure can also be realized as a program that can be executed by the processor or a non-transitory computer-readable medium that stores the program.

Furthermore, in the embodiment described above, the trigger detected for the visitor who is moving to the event venue is that the visitor boards on the vehicle 20 with the event venue as the destination. However, the trigger is not limited to this example, and may be any trigger that indicates that the visitor is moving to the event venue. For example, the trigger may be that the visitor who is moving to the event venue performs a predetermined operation on a terminal device such as a smartphone. In one example, the control unit 33 of the server 30 stores in the storage unit 32 in advance, for example, account information of a purchaser of a ticket for the event held at the event venue. The ticket purchaser logs into the system 1 from his or her own terminal device using the account information, and then operates route guidance with the event venue as the destination. When the ticket purchaser performs the operation for the route guidance to the event venue, the purchaser can be regarded as the visitor who is moving to the event venue. In response to the operation, the terminal device notifies the server 30 of the time when the ticket purchaser performs the operation (operation time). When the control unit 33 of the server 30 receives the notification of the operation time from the terminal device, the control unit 33 determines that the trigger is detected at the operation time (S100—Yes), and obtains the operation time as the target time (S101). Note that a destination to which the server 30 transmits various moving images may be the visitor's terminal device instead of the vehicle 20. According to this configuration, even when the visitor does not use the vehicle 20 and moves to the event venue by other means of transportation, various moving images can be presented to the visitor.

Furthermore, in the embodiment described above, various moving images may be presented using the shooting device 10 selected by the visitor who is moving to the event venue among the shooting devices 10 disposed at the event venue so that the shooting devices can shoot the event from mutually different shooting positions. Specifically, the visitor moving to the event venue selects a desired shooting position from the shooting positions of the shooting devices 10 via the input unit 23 of the vehicle 20. The control unit 25 of the vehicle 20 notifies the server 30 of the selected shooting position. When the control unit 33 of the server 30 receives a notification indicating the shooting position selected by the visitor from the vehicle 20, the control unit 33 uses the moving image shot by the shooting device 10 installed at the shooting position to present the first moving image, the second moving image, and the live moving image to the visitor. The selection of the shooting device 10 by the visitor may be repeatedly performed, for example, while the visitor is aboard on the vehicle 20.

A part of the embodiment of the present disclosure is shown as an example below. However, it should be noted that the embodiment of the present disclosure is not limited to these.

Embodiment 1

A server comprising a communication unit and a control unit, wherein:

- the control unit is configured to obtain, as a target time, a time when a predetermined trigger is detected for a visitor moving to an event venue,
- the control unit is configured to, when the target time is later than a start time of an event held at the event venue, by controlling the communication unit such that the communication unit transmits a first shortened moving image obtained by shortening a first moving image of the event shot from the start time to the target time, present the first shortened moving image to the moving visitor, and
- after a playback of the first shortened moving image ends, by transmitting a live moving image of the event, the control unit presents the live moving image to the moving visitor.

Embodiment 2

The server according to Embodiment 1, wherein

- the trigger may be that the visitor boards on a vehicle with the event venue as a destination.

Embodiment 3

The server according to Embodiment 1 or 2, wherein

- the control unit may be configured to, by controlling the communication unit such that the communication unit transmits the first shortened moving image and the live moving image to the vehicle and causing the first shortened moving image and the live moving image to be played back on a display provided in the vehicle, present the first shortened moving image and the live moving image to the visitor who is moving by the vehicle.

Embodiment 4

The server according to any one of Embodiments 1 to 3, wherein

- the trigger may be that the moving visitor performs a predetermined operation on a mobile terminal.

Embodiment 5

The server according to any one of Embodiments 1 to 4, wherein

- the control unit may be configured to, by controlling the communication unit such that the communication unit transmits the first shortened moving image and the live moving image to the mobile terminal and causing the first shortened moving image and the live moving image to be played back on a display provided on the mobile terminal, present the first shortened moving image and the live moving image to the moving visitor.

Embodiment 6

The server according to any one of Embodiments 1 to 5, wherein:

the control unit may be configured to obtain a specific position selected by the visitor from a plurality of mutually different shooting positions; and the first shortened moving image may be a moving image obtained by shortening the first moving image shot from the specific position among a plurality of the first moving images shot from the respective shooting positions.

Embodiment 7

The server according to any one of Embodiments 1 to 6, wherein:

the control unit may be configured to, when a playback of the first shortened moving image ends, by controlling the communication unit such that the communication unit transmits a second shortened moving image obtained by shortening a second moving image of the event shot from the target time to a playback end time of the first shortened moving image, present the second shortened moving image to the moving visitor; and the control unit may be configured to, after the playback of the second shortened moving image ends, present the live moving image to the moving visitor.

Embodiment 8

The server according to any one of Embodiments 1 to 7, wherein a ratio of a length of the first shortened moving image to a length of the first moving image may be different from a ratio of a length of the second shortened moving image to a length of the second moving image.

Embodiment 9

A method that is executed by a server, the method comprising:

obtaining, as a target time, a time when a predetermined trigger is detected for a visitor moving to an event venue;

when the target time is later than a start time of an event held at the event venue, by transmitting a first shortened moving image obtained by shortening a first moving image of the event shot from the start time to the target time, presenting the first shortened moving image to the moving visitor; and after a playback of the first shortened moving image ends, by transmitting a live moving image of the event, presenting the live moving image to the moving visitor.

Embodiment 10

The method according to Embodiment 9, wherein the trigger may be that the visitor boards on a vehicle with the event venue as a destination.

Embodiment 11

The method according to Embodiment 9 or 10, wherein by transmitting the first shortened moving image and the live moving image to the vehicle and causing the first shortened moving image and the live moving image to be played back on a display installed in the vehicle, the server may present the first shortened moving image and the live moving image to the visitor who is moving by the vehicle.

Embodiment 12

The method according to any one of Embodiments 9 to 11, wherein the trigger may be that the moving visitor performs a predetermined operation on a mobile terminal.

Embodiment 13

The method according to any one of Embodiments 9 to 12, wherein by transmitting the first shortened moving image and the live moving image to the mobile terminal and causing the first shortened moving image and the live moving image to be played back on a display provided on the mobile terminal, the server may present the first shortened moving image and the live moving image to the moving visitor.

Embodiment 14

The method according to any one of Embodiments 9 to 13, wherein:

the method may further include obtaining a shooting position selected by the visitor from a plurality of mutually different shooting positions; and the first shortened moving image may be a moving image obtained by shortening the first moving image shot from the selected shooting position among a plurality of the first moving images shot from the respective shooting positions.

Embodiment 15

A non-transitory storage medium storing instructions, the instructions being executable by one or more servers and causing the one or more servers to perform functions including:

obtaining, as a target time, a time when a predetermined trigger is detected for a visitor moving to an event venue;

when the target time is later than a start time of an event held at the event venue, by transmitting a first shortened moving image obtained by shortening a first moving image of the event shot from the start time to the target time, presenting the first shortened moving image to the moving visitor; and after a playback of the first shortened moving image ends, by transmitting a live moving image of the event, presenting the live moving image to the moving visitor.

Embodiment 16

The non-transitory storage medium according to Embodiment 15, wherein the trigger may be that the visitor boards on a vehicle with the event venue as a destination.

Embodiment 17

The non-transitory storage medium according to Embodiment 15 or 16, wherein the functions may include, by transmitting the first shortened moving image and the live moving image to the vehicle and causing the first shortened moving image and the live moving image to be played back on a display installed in the vehicle, presenting the first shortened moving image and the live moving image to the visitor who is moving by the vehicle.

Embodiment 18

The non-transitory storage medium according to any one of Embodiments 15 to 17, wherein the trigger may be that the moving visitor performs a predetermined operation on a mobile terminal.

Embodiment 19

The non-transitory storage medium according to any one of Embodiments 15 to 18, wherein the functions may include, by transmitting the first shortened moving image and the live moving image to the mobile terminal and causing the first shortened moving image and the live moving image to be played back on a display provided on the mobile terminal, presenting the first shortened moving image and the live moving image to the moving visitor.

Embodiment 20

The non-transitory storage medium according to any one of Embodiments 15 to 19, wherein:

the functions may further include obtaining a specific position selected by the visitor from a plurality of mutually different shooting positions; and the first shortened moving image may be a moving image obtained by shortening the first moving image shot from the specific position among a plurality of the first moving images shot from the respective shooting positions.

What is claimed is:

1. A server comprising:

a storage that stores account information of a user;

a communication unit; and at least one hardware processor, programmed to:

obtain, as a target time, a time when a predetermined trigger is detected for the user moving to an event venue, the predetermined trigger being a signal sent from a terminal device of the user to the server that indicates that the user has activated route guidance to the event venue, when the target time is later than a start time of an event held at the event venue, control the communication unit such that the communication unit transmits a first shortened moving image obtained by shortening a first moving image of the event shot from the start time to the target time, and present the first shortened moving image to the visitor user, and after a playback of the first shortened moving image ends, control the communication unit such that the communication unit transmits a live moving image of the event, and present the live moving image to the moving user.

2. The server according to claim 1, wherein the at least one hardware processor is configured to control the communication unit such that the communication unit transmits the first shortened moving image and the live moving image to a vehicle and cause the first shortened moving image and the live moving image to be played back on a display provided in the vehicle.

3. The server according to claim 1, wherein the at least one hardware processor is configured to control the communication unit such that the communication unit transmits the first shortened moving image and the live moving image to the terminal device and cause the first shortened moving image and the live moving image to be played back on a display provided on the terminal device.

4. The server according to claim 1, wherein:

the at least one hardware processor is configured to obtain a specific position selected by the user from a plurality of mutually different shooting positions; and the first shortened moving image is a moving image obtained by shortening the first moving image shot from the specific position among a plurality of the first moving images shot from the respective shooting positions.

5. The server according to claim 1, wherein:

the at least one hardware processor is configured to, when a playback of the first shortened moving image ends, control the communication unit such that the communication unit transmits a second shortened moving image obtained by shortening a second moving image of the event shot from the target time to a playback end time of the first shortened moving image, and present the second shortened moving image to the moving user; and the at least one hardware processor is configured to, after the playback of the second shortened moving image ends, present the live moving image to the moving user.

6. The server according to claim 5, wherein a ratio of a length of the first shortened moving image to a length of the first moving image is different from a ratio of a length of the second shortened moving image to a length of the second moving image.

7. The server according to claim 1, wherein the communication unit transmits the first shortened moving image and the live moving image to the terminal device of the user.

8. A method that is executed by a server, the method comprising:

storing account information of a user;

obtaining, as a target time, a time when a predetermined trigger is detected for the user moving to an event venue, the predetermined trigger being a signal sent from a terminal device of the user to the server that indicates that the user has activated route guidance to the event venue;

when the target time is later than a start time of an event held at the event venue, transmitting a first shortened moving image obtained by shortening a first moving image of the event shot from the start time to the target time, and presenting the first shortened moving image to the moving user; and after a playback of the first shortened moving image ends, transmitting a live moving image of the event, and presenting the live moving image to the moving user.

9. The method according to claim 8, wherein the method comprises transmitting the first shortened moving image and the live moving image to a vehicle and causing the first shortened moving image and the live moving image to be played back on a display installed in the vehicle.

10. The method according to claim 8, wherein the method comprises transmitting the first shortened moving image and the live moving image to the terminal device and causing the first shortened moving image and the live moving image to be played back on a display provided on the terminal device.

11. The method according to claim 8, further comprising obtaining a shooting position selected by the user from a plurality of mutually different shooting positions, wherein the first shortened moving image is a moving image obtained by shortening the first moving image shot from the selected shooting position among a plurality of the first moving images shot from the respective shooting positions.

12. A non-transitory storage medium storing instructions that are executable by one or more servers and that cause the one or more servers to perform functions comprising:

storing account information of a user;

obtaining, as a target time, a time when a predetermined trigger is detected for the user moving to an event venue, the predetermined trigger being a signal sent from a terminal device of the user to the server that indicates that the user has activated route guidance to the event venue;

when the target time is later than a start time of an event held at the event venue, transmitting a first shortened moving image obtained by shortening a first moving image of the event shot from the start time to the target time, and presenting the first shortened moving image to the moving user; and after a playback of the first shortened moving image ends, transmitting a live moving image of the event, and presenting the live moving image to the moving user.

13. The non-transitory storage medium according to claim 12, wherein the functions comprise transmitting the first shortened moving image and the live moving image to a vehicle and causing the first shortened moving image and the live moving image to be played back on a display installed in the vehicle.

14. The non-transitory storage medium according to claim 12, wherein the functions comprise transmitting the first shortened moving image and the live moving image to the terminal device and causing the first shortened moving image and the live moving image to be played back on a display provided on the terminal device.

15. The non-transitory storage medium according to claim 12, wherein:

the functions further include obtaining a specific position selected by the user from a plurality of mutually different shooting positions; and the first shortened moving image is a moving image obtained by shortening the first moving image shot from the specific position among a plurality of the first moving images shot from the respective shooting positions.

* * * * *